(12) United States Patent
Nozaki

(10) Patent No.: US 7,215,432 B2
(45) Date of Patent: May 8, 2007

(54) PRINTER SHARING CONTROL METHOD AND A SYSTEM FOR IMPLEMENTING THIS METHOD

(75) Inventor: Iwao Nozaki, Wakayama (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 916 days.

(21) Appl. No.: 10/156,747

(22) Filed: May 28, 2002

(65) Prior Publication Data

US 2002/0181008 A1    Dec. 5, 2002

(30) Foreign Application Priority Data

May 29, 2001    (JP) ............................. 2001-160112

(51) Int. Cl.
*G06K 15/00*    (2006.01)
*G06F 3/12*    (2006.01)

(52) U.S. Cl. ..................................... 358/1.14; 358/1.15

(58) Field of Classification Search ........ 358/1.1–1.18, 358/402, 403
See application file for complete search history.

(56) References Cited

U.S. PATENT DOCUMENTS 5,832,301 A    11/1998    Yamaguchi et al.
6,229,622 B1    5/2001    Takeda
6,295,117 B2 *    9/2001    Haraguchi et al. ............ 355/40
6,341,907 B1 *    1/2002    Katsuyoshi ................. 400/582

FOREIGN PATENT DOCUMENTS

| EP | 0 859 497 A | 8/1998 |
|---|---|---|
| JP | 10-275061 | 10/1998 |
| JP | 11-224168 | 8/1999 |
| JP | 11-296326 | 10/1999 |
| JP | 2000-006499 | 1/2000 |

\* cited by examiner

*Primary Examiner*—Douglas Q. Tran
(74) *Attorney, Agent, or Firm*—Fulbright & Jaworski L.L.P.

(57) ABSTRACT

A computer (2) connected to a printer (1) stores a printer sharing control program (50) for creating print spool files and sending the print spool files to the printer in response to print requests received from a plurality of printer use programs (40). The printer sharing control program (50) generates an interrupt printing control function (56) for storing interrupt printing condition information set to each print request source, a temporary storage function (54) for temporarily storing the print spool files for distinguishing the print request sources, and a data processing function (52) for sending a priority print spool file to the printer based on said interrupt printing condition information.

5 Claims, 9 Drawing Sheets

Fig.6

| error notice | print server | client 1 | client 2 |
|---|---|---|---|
| 0001 | out of paper | Please wait. | Please wait for attendant. |
| 0002 | paper jamming | Please wait. | ------ |
| 0003 | warm-up | Please wait 2min. | ------ |
| ------ | ------ | ------ | ------ |

PRINTER SHARING CONTROL METHOD AND A SYSTEM FOR IMPLEMENTING THIS METHOD

BACKGROUND OF THE INVENTION

1. Field of the Invention

This invention relates to a printer sharing control technique for causing a computer to make print spool files and send the print spool files to a printer in response to print requests received from a plurality of printer use programs.

2. Description of the Related Art

The printer sharing control technique is a technique for allowing a plurality of computers connected through a network to share a printer on the network. In general, the printer is connected to a computer called a printer server which stores a program for effecting a printer sharing control. On the other hand, computers called clients each store an application for using the printer, i.e. a printer use program, for sending print requests. The printer server temporarily stores, in predetermined units as print spool files, print data received from the printer use programs, and successively sends the print spool files to the printer. Where the computer acting as the printer server has a higher performance than just executing this printer sharing control, the printer use program may be installed also on the printer server. Thus, the printer server may act also as a client to share the printer.

The temporary storage of the print spool files basically is controlled on a FIFO (First In First Out) basis, in which a print spool file inputted earlier is sent out earlier. To accommodate an urgent print output from a particular client, the server has also a function for allowing such client to access its printer sharing function and forcibly change an order in which the print spools are stored. However, print outputs from the printer will be in confusion when printing priorities are frequently changed by the clients without permission. The type of data processing may vary among the plurality of clients sharing the printer. For example, one client may engage in a real-time processing, while another does a batch processing. In such a case, it is undesirable to allow the clients to change the priorities of print outputs freely.

SUMMARY OF THE INVENTION

Having regard to the state of the art noted above, the object of this invention is to provide a printer sharing technique that takes into account the natures of clients in processing data, to enable elaborate interrupt printing.

The above object is fulfilled, according to this invention, by a printer sharing control method for causing a computer to create print spool files and send the print spool files to a printer in response to print requests received from a plurality of printer use terminals, the method comprising:

- an interrupt printing controlling step for storing interrupt printing condition information set to each print request source;
- a temporary storing step for temporarily storing the print spool files created, in a way to distinguish the print request sources; and
- data processing step for sending to the printer a print spool file to be printed with first priority, selected from the print spool files stored temporarily based on the interrupt printing condition information.

In this printer sharing control method, a print spool file created upon receipt of a print request from each client is temporarily stored in a way to distinguish the print request source. A print spool file to be printed with first priority is determined from the interrupt print condition information. When the printer is in a condition for accepting print data (the printer being "ready"), this particular print spool file is sent to the printer to output prints based on this print spool file. In this way, a print spool file from which print request source should be sent to the printer is determined on the basis of the print spool files. Thus, an elaborate interrupt printing process may be carried out based on the interrupt print condition information. That conditions of interrupt printing for each client computer may be set strictly is advantageous in making a customer service process and an internal transaction process compatible in an optimal way where the client computer has separate uses for customer service and for internal batch processing.

A print request made from each printer use terminal may be not only for a single print or a plurality of prints, but for checking for an interrupt of a different print request by temporarily stopping at each print output. Thus, a print spool file selected as a prior interrupt print is sent at a variable time to the printer having already started a printing operation. For example, an interrupt printing may be carried out as soon as the printer becomes "ready" even if a print spool file belonging to the print request being printed remains unfinished. An interrupt printing may be started at least after completion of printer outputs for the entire print spool file belonging to the print request being printed. An interrupt printing may be performed upon temporary halt of print outputs for a preceding print request. To enable such variable interrupt timing to be set to each printer use program, in one preferred embodiment of this invention, the interrupt printing condition information includes an interrupt pattern for providing timing of an interrupt printing to be made during a printing operation on a print request.

Further, the interrupting print request may also include a plurality of prints. Moreover, it may be unnecessary to output all of these prints by interrupting the preceding print request. It will be convenient if the interrupt printing condition information includes a unit of interrupt for providing a proportion to be printed of an prints in an interrupting print request.

Where this printer sharing control method is applied to a printer server connected to a plurality of clients (printer use terminals), an error notice sent from the printer is forwarded as it is to a pertinent client in conventional practice. It may be better to provide only the server with a message based on an error notice "Out of paper", for example, and to provide the clients with a message such as "Please wait for a while." In this way, rather than processing an error notice from the printer alike for all clients, different messages may be displayed for different clients. To realize this feature, it is proposed as one preferred embodiment of this invention to provide an error message conversion table for defining, for each terminal, a form of converting an error notice received from the printer into an error message to be sent to each print request source.

In another aspect of this invention, a printer sharing control system is provided which includes computers storing programs for executing the above printer sharing control method. This invention is applicable also to a printer sharing control system that realizes the above printer sharing control method by both program and hardware, and to a printer server and a client forming part of such a printer sharing control system.

Particularly, this printer sharing control technique is capable of elaborately setting interrupt printing conditions to and displaying error messages for each computer sharing the printer. As a form to which this system is particularly suitable, a printer sharing control system is proposed in which the printer use terminals are automatic photo print ordering devices operable by customers, and the server computer which executes the above printer sharing control method mediates print requests from the plurality of automatic photo print ordering devices to the photo printer. With this construction, when print requests are made simultaneously from the plurality of printer use terminals, the server computer may send photo print data included in each print request to the photo printer so that photo prints based on all the print requests may be made substantially simultaneously. This eliminates the inconvenience that only a print request from a particular print ordering device or particular customer is processed later than the requests from the other customers. In this case, the photo printer outputs a mixture of photo prints ordered by the plurality of customers. Preferably, therefore, distinguishing information such as ID codes identifying the customers or print ordering devices are printed on the back surfaces of photo prints, or where the photo printer is equipped with a sorter, the sorter is controlled to sort the photo prints by customer or print ordering device.

Other features and advantages of this invention will be apparent from the following description of the embodiment to be taken with reference to the drawings.

BRIEF DESCRIPTION OF THE DRAWINGS

FIG. 6 is an explanatory view of contents of an error message translation table;

DESCRIPTION OF THE PREFERRED EMBODIMENT

Figure 1:
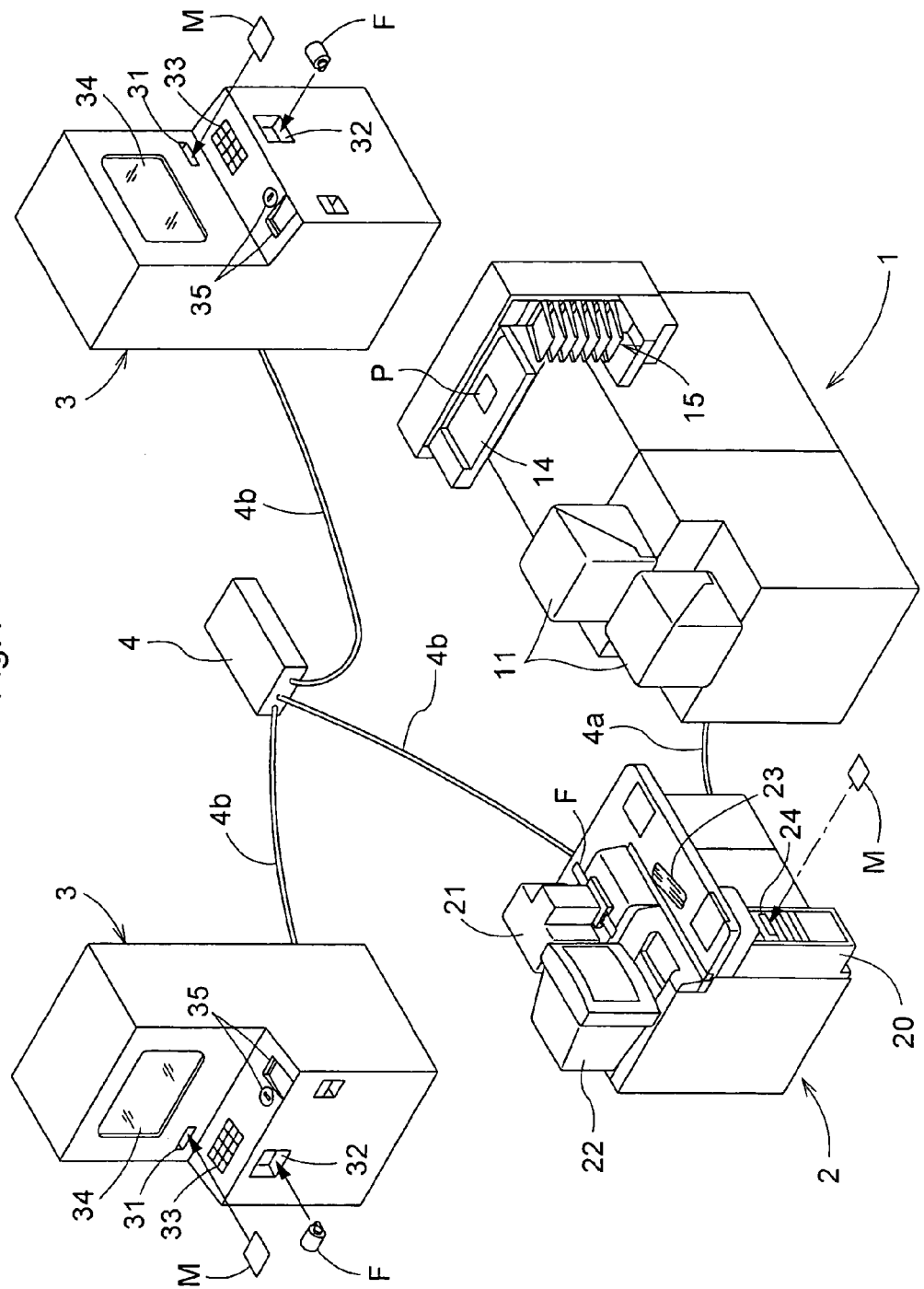
FIG. 1 is a schematic perspective view of a photo printing system employing the printer sharing technique according to this invention.

FIG. 1 is a schematic perspective view of a photo printing system employing the printer sharing technique according to this invention. This photo printing system includes, as basic components thereof, a print station 1 for exposing and developing silver bromide printing paper P, and a control station 2 for creating and transmitting print data for use at the print station 1. In this embodiment, the print station 1 and control station 2 are interconnected through a SCSI cable 4a for data transmission. The control station 2 is connected to a plurality of automatic photo print ordering devices 3 through Ethernet cables 4b with a hub 4 acting as a relay point. The automatic photo print ordering devices 3 are the vending machine type for sending print data to the print station 1 to make photo prints P. That is, as described in detail later, the print station 1 acts as a common printer for the automatic photo print ordering devices 3 and control station 2. In this embodiment, each automatic photo print ordering device 3 stores a printer use program 40 for outputting print data for photo prints to the print station 1. On the other hand, the control station 2 stores a similar printer use program 40 and a printer sharing control program 50 for sharing the print station 1. Thus, the automatic photo print ordering devices 3 will hereinafter be called clients 3, and the control station 2 printer server 2.

Figure 2:
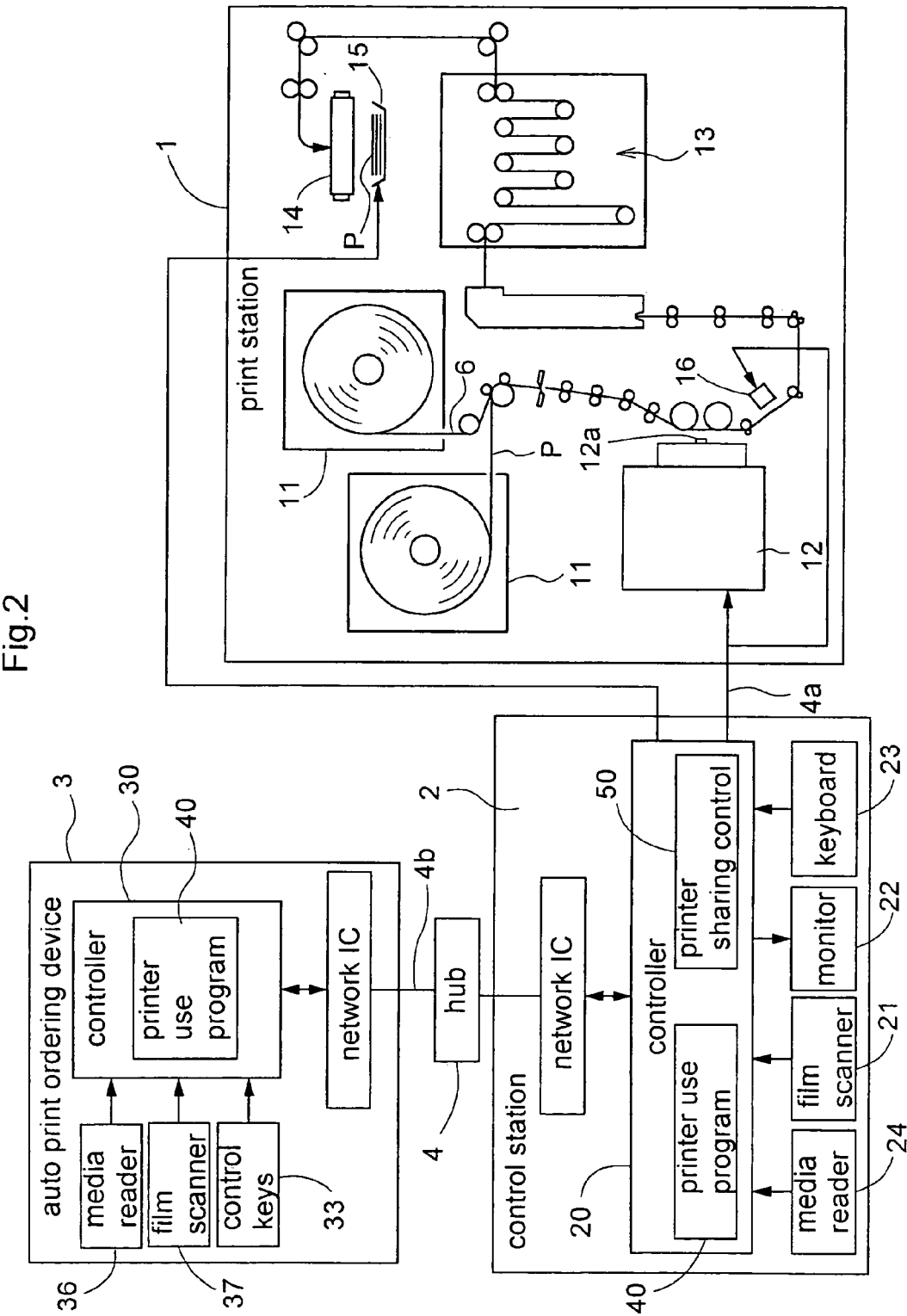
FIG. 2 is a block diagram of the photo printing system shown in FIG. 1.

As seen from FIG. 2, the print station 1 has two printing paper magazines 11 storing rolls of printing paper P. The printing paper P drawn therefrom is cut into print size. Cut printing paper P is exposed in an exposure unit 12. Exposed printing paper P is developed in a developing unit 13 having a plurality of developing tanks. After being dried, the printing paper or photo prints P are transported by a horizontal feed conveyer 14 mounted in an upper portion of the print station 1 to a sorter 15. The photo prints P are accumulated as sorted order by order in a plurality of trays of the sorter 15.

A back printing device 16 in the form of a dot impact printer or the like is disposed upstream or downstream (downstream in FIG. 2), with respect to the printing paper transporting direction, of the exposure unit 12. The printing device 16 prints, on the back surfaces of photo prints P, printed photo attribute information such as source data of photo prints P outputted, i.e. data identifying the automatic photo print ordering devices 3 having requested the photo prints P.

The exposure unit 12 includes an exposure head 12a for transporting the printing paper P and exposing the printing paper P to rays of three primary colors, R (red), G (green) and B (blue), based on print data received from the control station 2. In time of exposure, the exposure unit 12, while transporting the printing paper P in a secondary scanning direction, exposes the printing paper P linearly along a primary scanning direction synchronously with the transport speed. The exposure head may employ a fluorescent beam mode, liquid crystal shutter mode, DMD mode or FOCRT mode according to exposure specifications. The developing unit 13 includes a transport system having numerous press rollers (not shown) for transporting exposed printing paper P successively through the plurality of developing tanks.

The printer server 2 includes a film scanner (hereinafter called simply the scanner) 21 mounted on a desk-like console with an operation table, for acquiring photographic images from photo film F as image data in the form of digital signals, and a CRT display (hereinafter called simply the monitor) 22 also mounted on the console for displaying various information. Further, a keyboard 23 is disposed on the operation table for inputting operator commands. Below the operation table is a main computer unit acting as a controller 20 for possessing the image data read from the photo film F by the scanner 21, creating print data, and transmitting the print data to the print station 1. The controller 20 has a media reader 24 for acquiring image data from recording media M such as SmartMedia and CompactFlash used as photographic image memories of digital cameras.

Each automatic photo print ordering device acting as client 3 with which LAN is connected through a LAN to the control station acting as the printer server 2, as schematically shown in perspective in FIG. 1, has a box-like housing installed at the front of a photo processing shop, for example. This housing defines an insert slot 31 for customers to insert recording media M, a loading opening 32 for receiving films F, a control key set 33 for inputting commands for photo printing orders, a monitor 34 for displaying images and other information corresponding to image data acquired from the recording media M and film F, and cash inlets 35 for putting in printing fees. As schematically shown in FIG. 2, the core member of each client 3 is a computer acting as a controller 30. The controller 30 stores and executes the printer use program 40 to perform a necessary image processing on image data acquired by a media reader 36 and a film scanner 37, then create print data, and transmit the print data to the print station 1 through the printer server 2.

The printer use program 40 is a program designed to output print requests to the printer for printing out results obtained by processing inputted data. Most application programs installed in computers take such a form. In lids embodiment in particular, the printer use program 40 is intended to be a photo printing program for performing image processing such as color correction, trimming and filtering on inputted image data, and outputting print data suited for photo printing in the print station 1. Such a program is well known, and no further description will be made herein.

Figure 3:
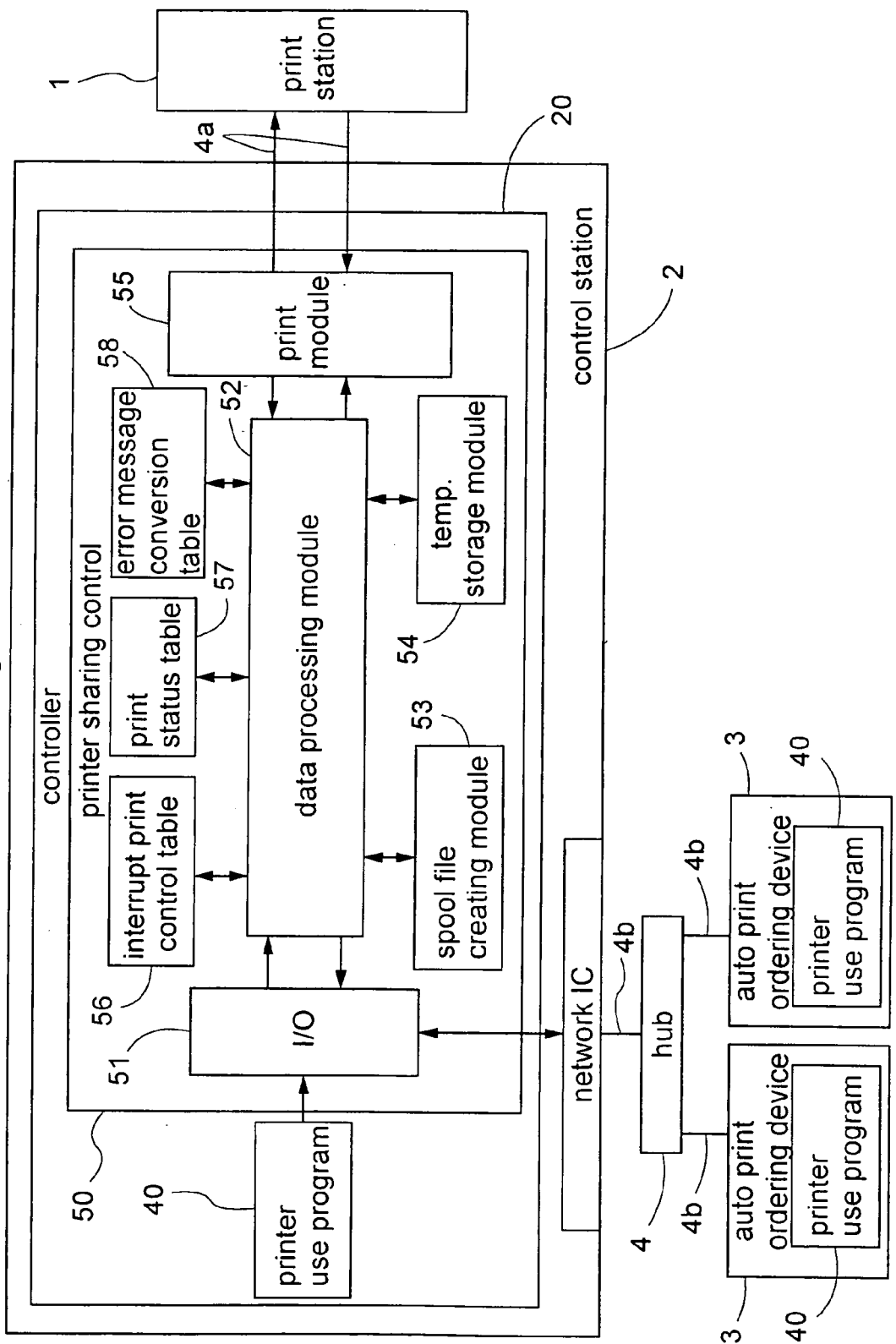
FIG. 3 is a functional block diagram showing the functions implemented by a printer sharing control program.

The printer sharing control program 50 is designed for a printer connected to the computer executing this program to be used by other computers. In this embodiment, a printer sharing control unit 50 with various functions is formed in the controller 20. This printer sharing control unit 50 will be described hereinafter with reference to the functional block diagram of FIG. 3.

The printer sharing control unit 50 provided in the controller 20 by the printer sharing control program includes an I/O module 51 for receiving print data from the printer use program 40 installed in this controller 20 and print data from the printer use program 40 in each client 3, a spool file creating module (spool file creating function) 53 for making the print data received into print spool files, a temporary storage module (temporary storage function) 54 for temporarily storage the print spool files created (hereinafter called simply the spool files), a data processing module (data processing function) 52 for controlling the spool file creating module 53 and temporary storage module 54, and a print module 55 for transmitting the spool files to the print station 1 and requesting print outputs.

The data processing module 52 refers to interrupt printing condition information stored in an interrupt printing control table (interrupt printing control function) 56 to select, from among the spool files stored in the temporary storage module 54, a spool file to be outputted to the print module 55 with priority. The data processing module 52 refers also to a printer status (i.e. ready or busy) stored in a printer status table 57 in order to make a necessary confirmation that the print station 1 is in the "ready" state when transferring the spool file from the temporary storage module 54 to the print module 55.

When forwarding the spool file to the print module 55, the data processing module 52 adds information such as an ID code identifying the client 3 having created the print data forming the basis for the spool file. This client information is recorded on the back surfaces of corresponding photo prints P by the back printing device 16 in the print station 1. The sorter 15 of the print station 1 is controlled based on the client information added. Thus, even when spool files from different clients 3 are processed successively, photo prints P outputted are sorted to the trays of sorter 15 on a client-by-client basis.

The printer common control unit 50 further includes an error message conversion table (error message converting function) 58 to be referred to for converting an error notice received from the print station 1 into an appropriate error message to be sent to the controller 20 or 30. The error message conversion table 58 is linked to the data processing module 52.

Figure 4:
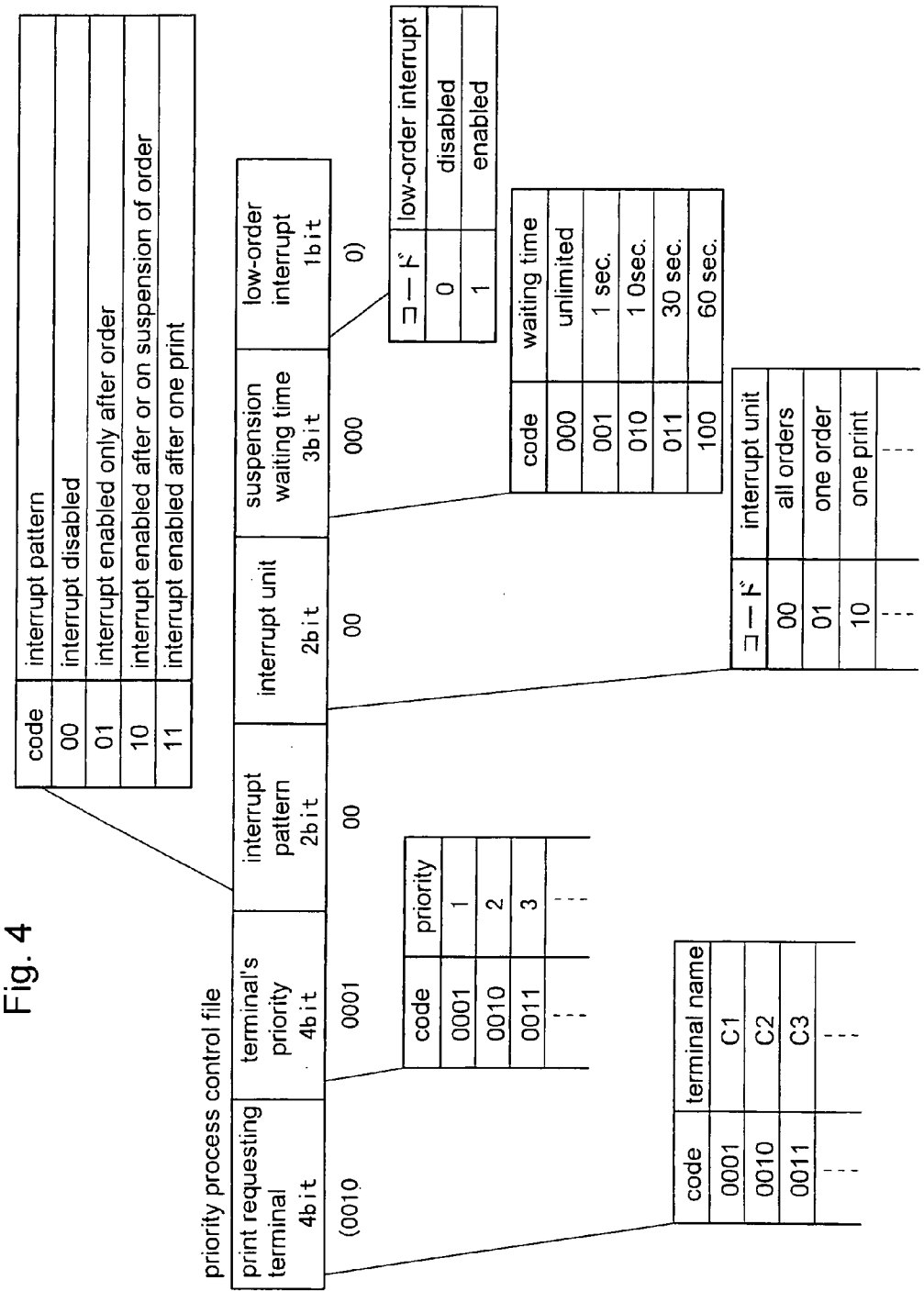
FIG. 4 is a data structure diagram of interrupt print condition information.

The data structure of the interrupt printing condition information stored in the interrupt printing control table 56 will be described next with reference to FIG. 4. The first four bits provide the printer use program having made the print request, i.e. the controller 20 or 30 having made the print request. To simplify the description, the printer use program 40 of the printer server 2 will be called herein the first terminal C1, and the printer use programs 40 of two clients 3 the second terminal C2 and third terminal C3, respectively. For example, these four bits {0001} represent the first terminal C1.

The next four bits provide basic priorities among the respective terminals. The bits {0001} mean the first priority, and {0010} mean the second priority. The next two bits provide interrupt patterns determining when to enable an interrupt printing. The bits {00} mean that no interrupt printing is enabled at any time. The bits {01} mean that an interrupt printing is enabled only upon completion of one order (which usually is a unit of printing of one film or one recording medium). The bits {10} mean that an interrupt printing is enabled upon completion or suspension of printing of an order. The bits {11} mean that an interrupt printing is enabled upon completion of one print. The suspension of printing is a standby state in which a next spool file is not transmitted to the print station 1, and which caused by pressing a suspend button during a printing operation. When an interrupt printing is enabled upon suspension, a spool file based on a print request by a different terminal is sent with priority to the print station 1. However, the interrupt printing is enabled upon suspension, on the condition that the suspension is not canceled within a predetermined time after the suspend button is pressed. The suspension waiting time serving as the condition of interrupt printing is provided by the next three bits. For example, the bits {000} mean an unlimited waiting time. That is, an interrupt printing must wait for an indefinite time to determine whether the suspension is canceled after the suspend button is pressed. This means that an interrupt printing by the suspend button is virtually impossible. The bits {001} mean a waiting time of one second. That is, this means in substance that an interrupt printing by the suspend button is always possible. The bits {010} mean a waiting time of ten seconds. This means that an interrupt printing is enabled unless the suspension is canceled within ten seconds. The next one bit provides whether to enable an interrupt printing from a terminal of lower priority upon suspension. The bit {0} means disabling, and {1} means enabling.

When, for example, interrupt printing condition information {0010000100000000} is set to the second terminal C2 (controller 30), the first terminal C1 has the first priority, absolutely no interrupt is enabled, the unit of interrupt printing is all orders, and neither an interrupt by the suspend button nor an interrupt from a terminal of lower priority is enabled. Such condition setting that does not enable interrupts from other terminals at all may conveniently applied to an automatic photo printing order device operated by a customer. On the other hand, a setting for enabling free interrupts may be applied to a terminal processing photo printing in batches. Such interrupt printing condition information may be written to (or stored in) the print control table 56 by writing it directly to the printer sharing control program 50 from the keyboard 23. However, it will be convenient to store a script file or the like describing interrupt printing condition information by a predetermined format, with a predetermined file name in a predetermined directory. Then, the information may be automatically read from the printer sharing control program 50.

Figure 5:
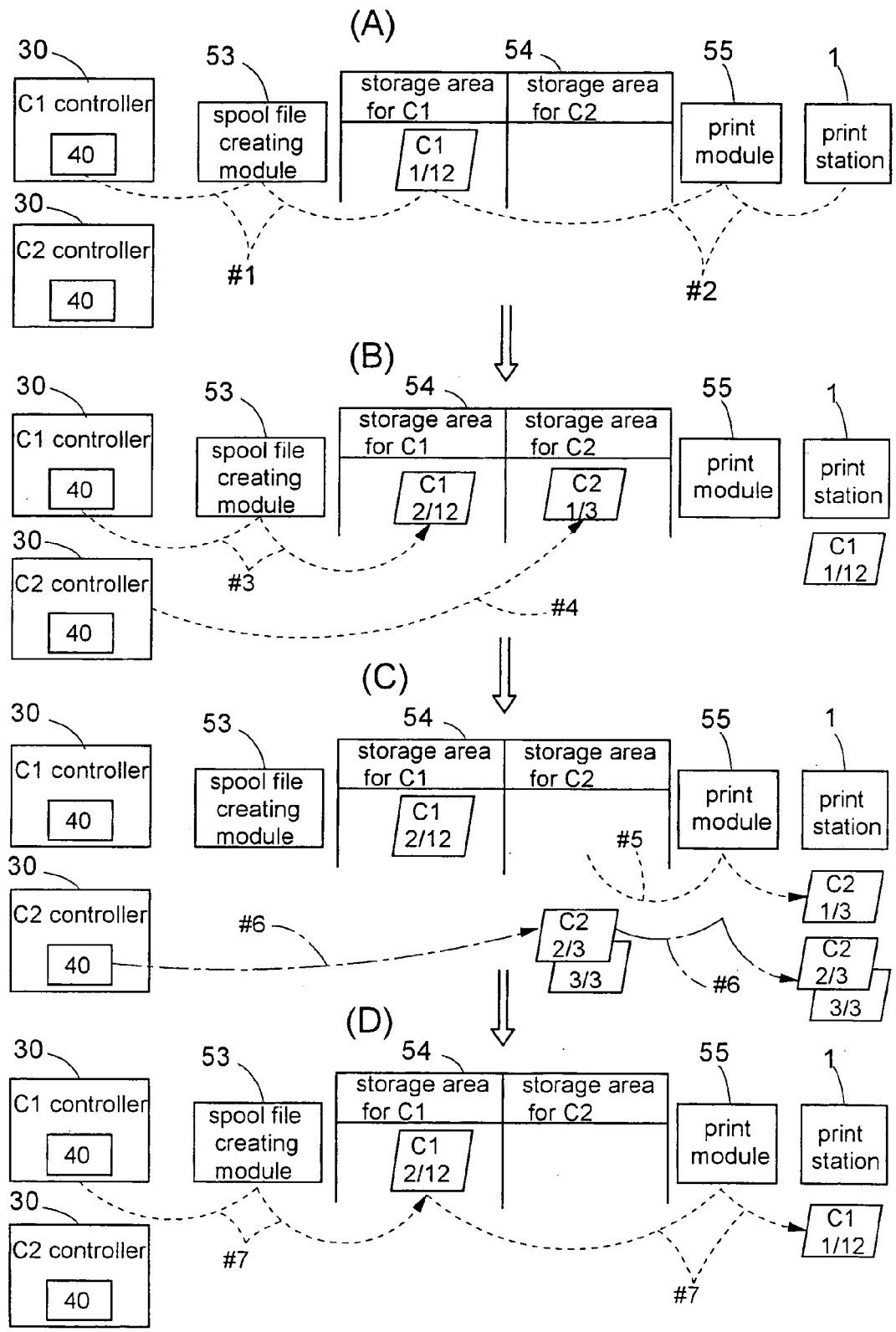
FIG. 5 is a schematic view showing flows of spool files in time of interrupt printing.

Spool files created based on print requests from the terminals C1, C2 and C3 are stored in the temporary storage module 54. While performing interrupt processes, these files are forwarded to the print module 54, and hence to the print station 1. This procedure will be described next with reference to the schematic view of FIG. 5. It is assumed here that the first terminal C1 acting as the printer server 2 and the second terminal C2 acting as a client 3 are connected together. Interrupt printing condition information set to the first terminal C1 is assumed to provide the second priority the interrupt pattern enabling an interrupt upon completion of one print, the unit of interrupt being one print, and the suspension waiting time of ten seconds. Interrupt printing condition information set to the second terminal C2 is assumed to provide the first priority, no interrupt acceptance, the unit of interrupt being one order, and the suspension waiting time unlimited.

First, a spool file of the first print in a print order for 12 photo prints from the first terminal C1 is stored in a storage area for the first terminal C1 of the temporary storage module 54 (#1). When the print station 1 is "ready", the spool file is forwarded to the print module 55 (#2). Next, a spool file of the second print is stored in the storage area for the first terminal C1 (#3). A spool file of the first print in a print order for three photo prints from the second terminal C2 is stored in a storage area for the second terminal C2 (#4). At this point, two files exist in the two storage areas for the first terminal C1 and second terminal C2 of the temporary storage module 54. The data processing module 52 determines from the interrupt printing condition information set to the respective terminals which spool file to be forwarded to the print module 55 first. Since the first terminal C1 enables an interrupt upon completion of one print, the spool file stored in the storage area for the second terminal C2 is forwarded to the print module 55 when the print station 1 is "ready" (#5). Since the unit of interrupt for the second terminal C2 is one order, all spool files for this order originated from the second terminal C2 are successively forwarded to the print module 55 (#6). Subsequently, the spool file in the storage area for the first terminal C1 is forwarded to the print module 55, to resume the print outputs for the order from the first terminal C1 (#7).

FIG. 6 schematically shows the contents of the error conversion table 58.

With this error conversion table 58, error notices (error codes) transmitted from the print station 1 may be converted into different error messages for different terminals registered (i.e. the printer server 2 and clients 3). In response to an error notice inputted, the data processing module 52 refers to the error conversion table 58, reads an error message for each terminal, and stores the error message in a storage area assigned to each terminal of the temporary storage module 54. The error messages stored in such storage areas are successively sent to and displayed at the terminals by an error message display routine.

When error code {0001} is notified, for example, a message "Out of paper" prompting error recovery action is displayed on the monitor 22 at the terminal (i.e. the printer server 2) operated by a professional operator. The monitors 34 at the terminals (i.e. the clients 3) operated by customers or the like display a message "Please wait." or "Please wait for attendant."

Figure 7:
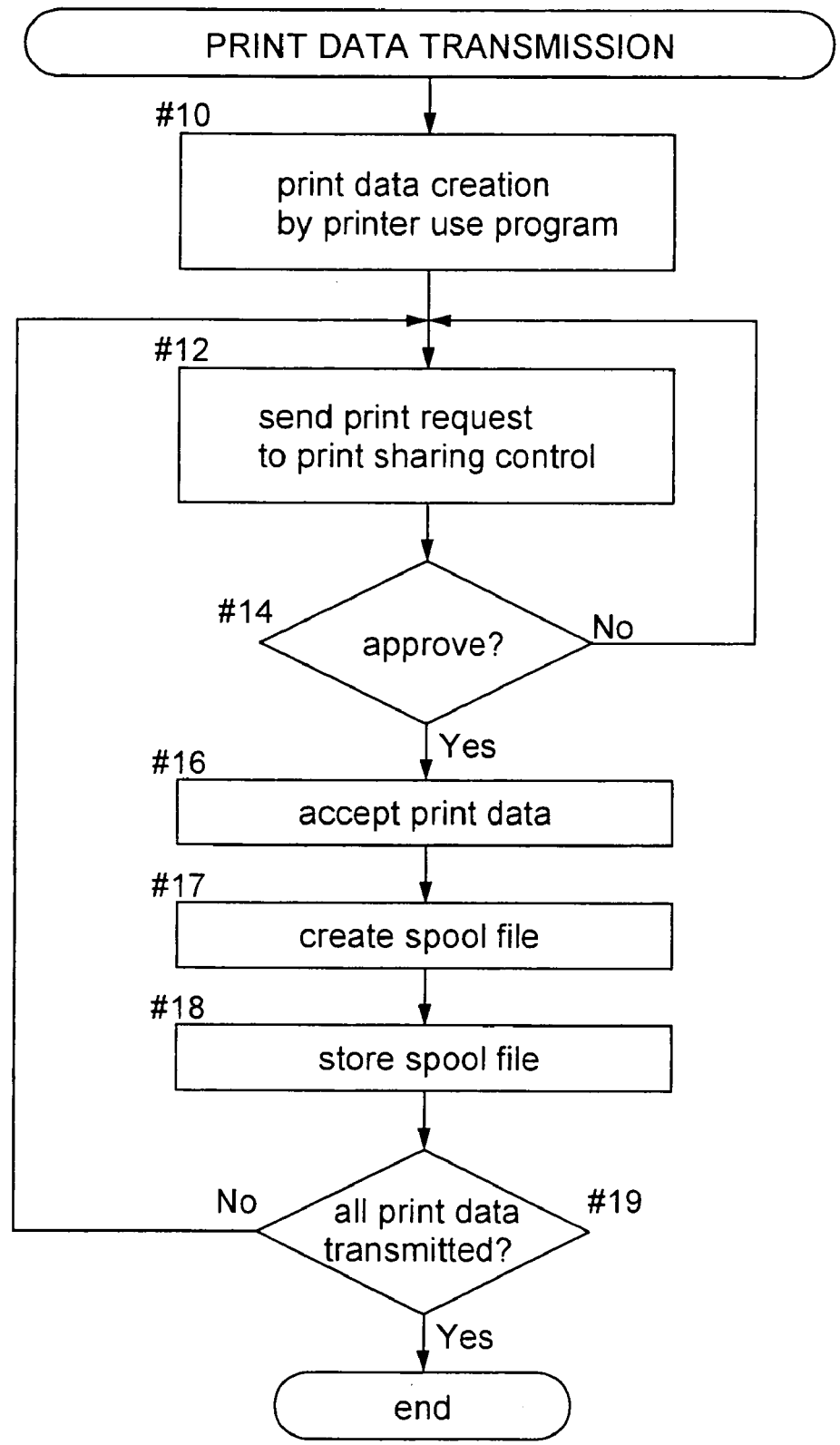
FIG. 7 is a flow chart of a print data transfer process.

In the photo printing system employing the above printer sharing technique, print data is transmitted from the printer use program 40 installed in the controller 20 or 30 of printer server 2 or clients 3 to the printer sharing control program (printer sharing control unit) 50. This procedure will be described with reference to the flow chart of FIG. 7.

First, when print data is created by the printer use program 40 (#10), a print request is transmitted to the printer sharing control unit 50 (#12). The data processing module 52 refuses to accept this print request ("No" from #14) when a spool file is found standing by in a predetermined storage area of the temporary storage module 54. Thus, the print request is repeated at predetermined intervals. The print request is approved ("Yes" from #14) when no spool file is on standby in the predetermined storage area. The print data based on the print request is accepted through the I/O module 51 (#15). From the print data inputted the spool creating module 53 creates a spool file corresponding to one photo print (#17). The spool file created is stored in the predetermined storage area of the temporary storage module 54 (#18). In this embodiment, the temporary storage module 54 stores only one spool file originating from the same printer use program 40. As long as a preceding spool file is on standby for printing, the transmission of new print data is not approved. The process from step #12 to #18 is continued until all the print data created by the printer use program 40 is transmitted to the printer sharing control unit 50 (#19).

Figure 8:
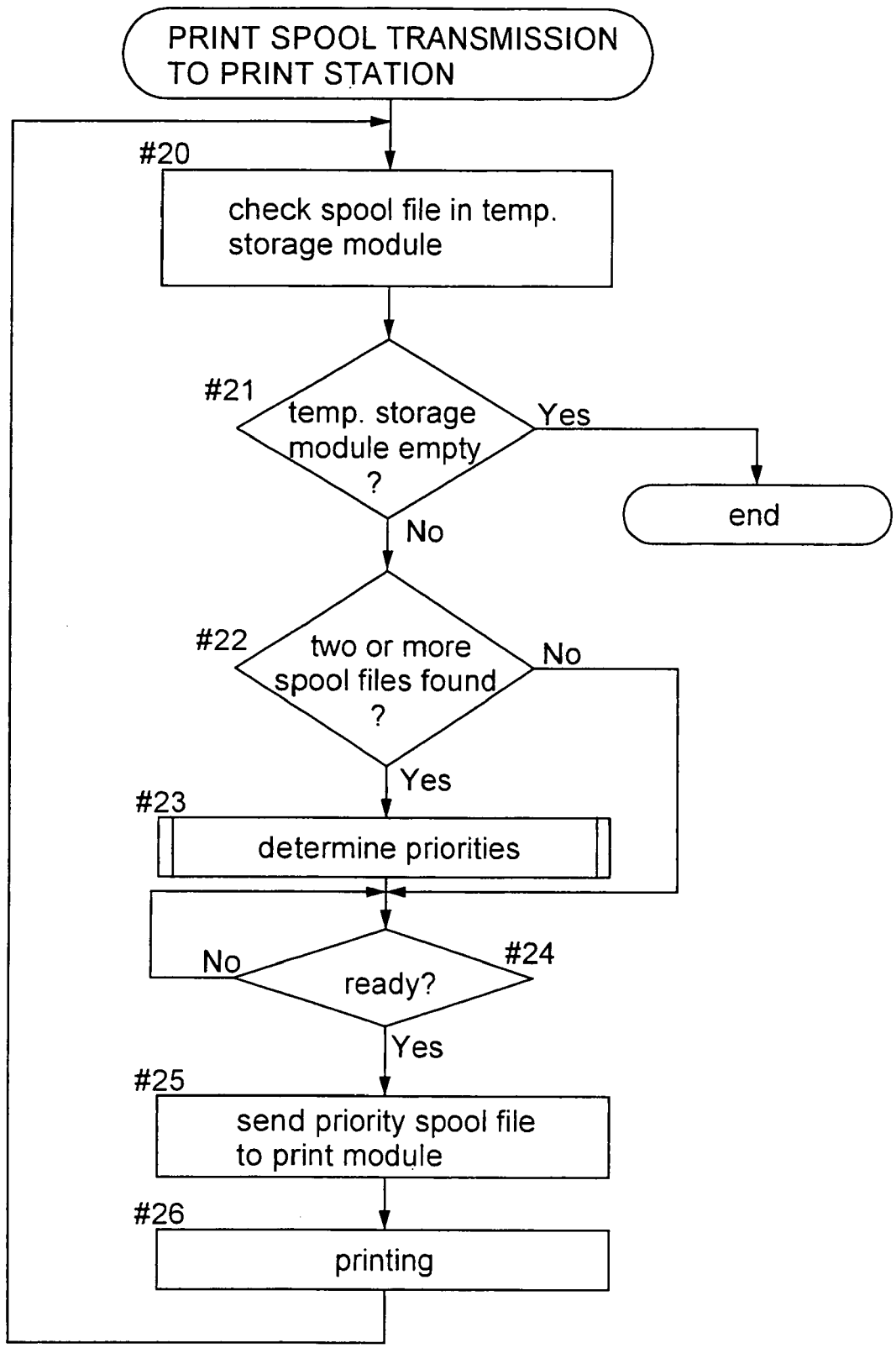
FIG. 8 is a flow chart of a spool file transfer process.

A process of forwarding spool files from the temporary storage module 54 to the print module 55, i.e. to the print station 1, will be described with reference to the flow chart of FIG. 8.

The data processing module 52 accesses the temporary storage module 54, and checks whether a spool file is stored therein (#20). When the temporary storage module 54 is empty ("Yes" from #21), this routine is terminated at once. When the temporary storage module 54 is not empty ("No" from #21), and when a plurality of spool files originating from different printer use program 40 are found ("Yes" from #22), the data processing module 52 accesses the interrupt printing control table 56, refers to the interrupt printing condition information obtained, and determines which one of the spool files should be given priority (#23). Subsequently, the data processing module 52 accesses the printer status table 57 and checks the state of the print station 1 (#24). After standing by until the printer status becomes "ready", the priority spool file is forwarded to the print module 55 (#25). At this time, an ID code, e.g. "C1", identifying the client having created the print data made into the spool file is added to the spool file forwarded to the print module 55.

The spool file forwarded to the print module 55 is transmitted to the print station 1 through SCSI interface 5 and SCSI cable 4a. One photo print P based on this spool file is made (#26). At this time, the client ID code added to the spool file is printed on the back surface of photo print P. The sorter 15 is controlled to sort the photo print P to the tray specified by this client ID code.

Figure 9:
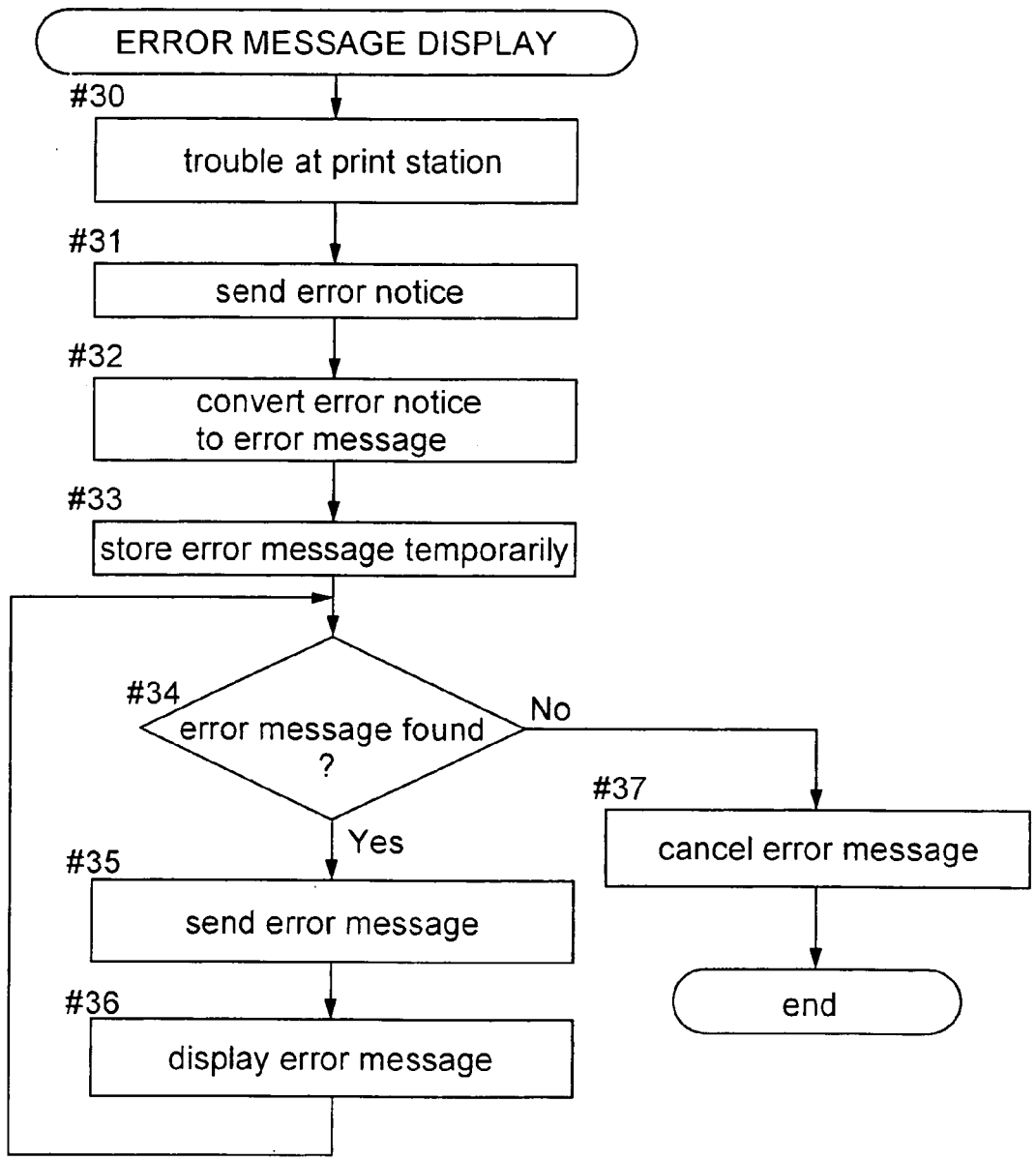
FIG. 9 is a flow chart of an error message display process.

Information on an error occurring at the print station 1 is displayed on the monitors 22 and 34 of the respective operation terminals (i.e. the printer server 2 and clients 3). This error message displaying process will be described next with reference to the flow chart of FIG. 9.

A trouble is detected and an error notice (error code) is created at the print station 1 (#30). The error notice is transmitted from the print station 1 to the printer sharing control unit 50 (#31). The data processing module 52 accesses the error message conversion table 58, and reads an error message corresponding to the error notice received for each operation terminal (#32). The error message is stored in a predetermined storage area of the temporary storage module 54 (#33). The data processing module 52 searches the error message storage area of the temporary storage module 54 at predetermined intervals. When an error message is found ("Yes" from #34), this error message is transmitted to a corresponding operation terminal (#35). Each operation terminal displays an error message received on the monitor 22 or 34 (#36). When the trouble is eliminated, the error message is erased from the temporary storage module 54, and the display of the error message at the operation terminal is discontinued (#37).

In such an error message display, even if the same trouble occurs at the print station 1, the error message displayed in each operation terminal may be varied to an optimal message for the user operating each operation terminal. For example, a detailed error message may be given to an operation terminal regarded as being operated by a user capable of dealing with the trouble. An error message of apologetic nature may be displayed at an operation terminal used by a customer or the like.

A transfer of print data may be effected by writing the print data to a hard disk, by forwarding the print data directly to memory, or by writing it to the hard disk once and then forwarding it to memory.

In the above embodiment, the print station 1 employs the print engine for exposing printing paper to photo images. Instead, an ink jet printer or color laser printer may be employed as the print engine. Further, this invention is applicable to document printing besides photo printing.

What is claimed is:

1. A printer sharing control method for creating print spool files and sending the print spool files to a printer in response to print requests received from a plurality of printer use terminals, said method comprising:

an interrupt printing controlling step for storing interrupt printing condition information set to each print request source, wherein said interrupt printing condition information includes an interrupt pattern for providing timing of an interrupt printing to be made during a printing operation on a print request;

a temporary storing step for temporarily storing said print spool files created, in a way to distinguish the print request sources; and data processing step for sending to said printer a print spool file to be printed with first priority, selected from the print spool files stored temporarily based on said interrupt printing condition information.

2. A printer sharing control system as defined in claim 1, further comprising an error message conversion step for defining, for each terminal, a form of converting an error notice received from the printer into an error message to be sent to each print request source.

3. A printer sharing control system as defined in claim 1, further comprising the step of adding information on a printer use terminal requesting prints when a print spool file is sent to the printer.

4. A printer sharing control method as defined in claim 1, wherein said interrupt printing condition information includes a data structure having bit areas for providing said printer use terminals.

5. A printer sharing control method as defined in claim 4, wherein said interrupt printing condition information includes a unit of interrupt for providing a proportion to be printed of all prints in an interrupting print request.

* * * * *